(12) United States Patent
Kokott et al.

(10) Patent No.: US 11,933,376 B2
(45) Date of Patent: Mar. 19, 2024

(54) VEHICLE BRAKE DISC

(71) Applicant: Bayerische Motoren Werke Aktiengesellschaft, Munich (DE)

(72) Inventors: Kordian Kokott, Unterschleissheim (DE); Florian Walther, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 142 days.

(21) Appl. No.: 17/594,205

(22) PCT Filed: Apr. 1, 2020

(86) PCT No.: PCT/EP2020/059277
§ 371 (c)(1),
(2) Date: Oct. 6, 2021

(87) PCT Pub. No.: WO2020/224875
PCT Pub. Date: Nov. 12, 2020

(65) Prior Publication Data
US 2022/0178411 A1 Jun. 9, 2022

(30) Foreign Application Priority Data
May 9, 2019 (DE) ..................... 10 2019 112 203.1

(51) Int. Cl.
F16D 65/12 (2006.01)
F16D 65/02 (2006.01)

(52) U.S. Cl.
CPC ......... *F16D 65/128* (2013.01); *F16D 65/123* (2013.01); *F16D 2065/1316* (2013.01);
(Continued)

(58) Field of Classification Search
CPC ... F16D 65/123–128; F16D 2065/1316; F16D 2065/1328; F16D 2065/1392; F16D 2200/0013
(Continued)

(56) References Cited

U.S. PATENT DOCUMENTS

| 4,280,598 A | * | 7/1981 | Pollinger | ............... F16D 65/123 188/218 XL |
| 9,315,070 B2 | * | 4/2016 | Anno | ...................... F16D 1/076 |

(Continued)

FOREIGN PATENT DOCUMENTS

| DE | 2 306 163 A1 | 8/1974 |
| DE | 39 02 657 A1 | 8/1990 |

(Continued)

OTHER PUBLICATIONS

International Search Report (PCT/ISA/210) issued in PCT Application No. PCT/EP2020/059277 dated Jul. 30, 2020 with English translation (six (6) pages).

(Continued)

*Primary Examiner* — Christopher P Schwartz
(74) *Attorney, Agent, or Firm* — Crowell & Moring LLP

(57) ABSTRACT

A disk brake for a motor vehicle includes an internally ventilated brake disk, a brake disk nave, and radially directed bores. In the radially directed first bores the connecting means are introduced such that they extend further into radially directed second bores in the friction ring into the friction ring. The brake disk nave forms the fit with a single friction ring half and this fit has material convexities, which point inward toward the cooling channels or the ribs, at the points at which the second bores are introduced for the connecting means.

16 Claims, 1 Drawing Sheet

(52) U.S. Cl.
CPC ............... *F16D 2065/1328* (2013.01); *F16D 2065/1392* (2013.01); *F16D 2200/0013* (2013.01)

(58) Field of Classification Search
USPC ............................ 188/18 A, 218 A, 218 XL
See application file for complete search history.

(56) References Cited

U.S. PATENT DOCUMENTS

| | | | |
|---|---|---|---|
| 11,346,415 B2* | 5/2022 | Wagner | F16D 65/125 |
| 11,466,740 B2* | 10/2022 | Raab | F16D 65/123 |
| 2021/0010550 A1 | 1/2021 | Raab et al. | |

FOREIGN PATENT DOCUMENTS

| | | |
|---|---|---|
| DE | 100 32 972 A1 | 1/2002 |
| DE | 10 2006 043 945 A1 | 3/2008 |
| DE | 10 2008 018 326 A1 | 10/2009 |
| DE | 10 2008 035 750 A1 | 2/2010 |
| DE | 10 2011 120 438 A1 | 12/2012 |
| DE | 10 2017 210 451 A1 | 10/2018 |
| EP | 0 872 659 A1 | 10/1998 |

OTHER PUBLICATIONS

German-language Written Opinion (PCT/ISA/237) issued in PCT Application No. PCT/EP2020/059277 dated Jul. 30, 2020 (five (5) pages).

German-language Search Report issued in German Application No. 10 2019 112 203.1 dated Dec. 18, 2019 with partial English translation (14 pages).

\* cited by examiner

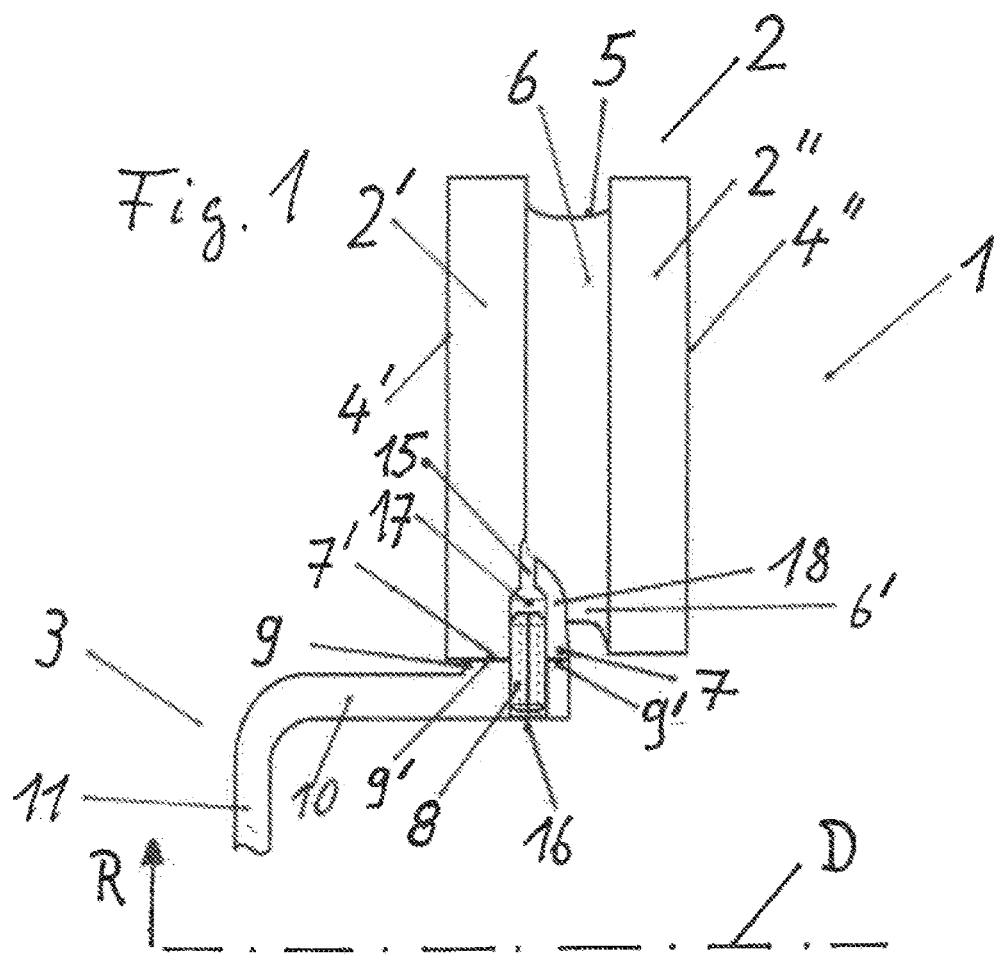
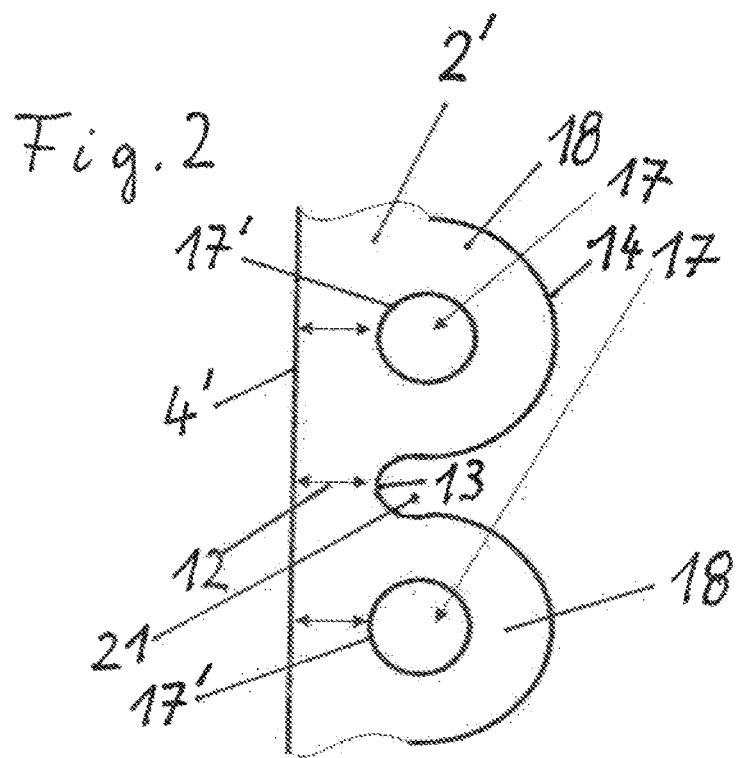

VEHICLE BRAKE DISC

BACKGROUND

This disclosure relates to a composite brake disk for a motor vehicle. Composite brake disks are constituent parts of a brake system for motor vehicles that are mounted coaxially with a wheel and have a friction ring and a brake disk nave. The brake disk nave serves in this respect to fasten the brake disk to a wheel hub, while the friction ring is brought into tribological contact with the brake linings of the brake system during the braking operation. This dissipates the kinetic energy of the motor vehicle in the form of frictional heat; the vehicle is braked.

Such brake disks may be manufactured in multiple parts, the largest stresses being directed at the material of the friction ring. Friction rings are therefore generally designed as cast components, in particular in GG-15 or GG-25. In order to remove the heat which is produced during the braking operation from the friction ring, such friction rings are frequently configured in the form of internally ventilated friction rings, that is to say they are provided with channels or bores through which air flows, in order thus to improve the removal of heat from the friction ring.

Such a brake disk, in which the friction ring is manufactured separately from the brake disk nave and suitably connected to it thereafter, has the advantage that the friction ring on the one hand and the brake disk nave on the other hand can be manufactured from the materials which are most favorable in respect of the respective requirements. In this way, it is possible for example firstly to obtain a weight saving, and secondly advantageous decoupling between the friction ring and the brake disk nave is possible thereby.

DE 39 02 657 A1 describes a brake disk for rail vehicles, which is characterized in that a hub of the brake disk is pressed on a wheelset shaft, which carries a ventilated friction ring on a part of its outer surface. This friction ring is fastened to a collar of the hub, which collar is formed axially on the outside, by means of radial clamping sleeves arranged in a distributed manner in the middle of the inner circumference of the friction ring, and the clamping sleeves are secured against radial displacements by transverse pins.

Such a design of a brake disk has the disadvantage that clamping sleeves with these transverse pins passing through them are arranged in cooling channels and allow much less ventilation than cooling channels without clamping sleeves, this causing the friction ring to cool non-uniformly. Moreover, radial expansion of the hub and the friction ring on account of their being heated as a result of the braking operation also takes place specifically in the region of the clamping sleeve, it being possible for this to lead to a relative movement between the clamping sleeve and the hub and friction ring, possibly even with abrasive wear.

SUMMARY

It is therefore an object of the present disclosure, in the case of a brake disk for a disk brake for motor vehicles, by virtue of a suitable connection and configuration of the friction ring and brake disk nave to arrange the connecting means in such a way that the space required for the connecting means has as little influence as possible on the uniform cooling of the brake disk. The intention is to provide such a connection between the brake disk nave and the friction ring which, when there is heating as a result of the braking operation, further improves the brake disk in terms of reducing the internal build-up of stress, in particular as far as possible no relative movement should take place between the connecting means and the surface of their insertion bores in the friction ring and brake disk nave. Moreover, the brake disk should be able to be mounted in a simple and cost-effective manner.

This and other objects are achieved according to this disclosure by a disk brake for a motor vehicle is, having an internally ventilated brake disk, at least consisting of a friction ring with an external friction surface on each one of two friction ring halves connected by ribs which are located therebetween, form cooling channels between the friction ring halves and consist of a brake disk nave, which is connected to the friction ring via radially directed connecting means, in particular clamping sleeves, locating pins with a passage bore or blind rivets, and has on its casing a collar, which extends in the radial direction, forms a fit to an external diameter of the friction ring by way of an outer circumferential surface and to an internal diameter of the friction ring by way of an inner circumferential surface, and has radially directed first bores, in which the connecting means are introduced such that they extend further into likewise radially directed second bores in the friction ring into the friction ring, characterized in that the brake disk nave forms the fit with a single friction ring half and this fit has material convexities, which point inward toward the cooling channels or the ribs, at the points at which the second bores are introduced for the purpose of partially receiving the connecting means.

Exclusively connecting the brake disk nave and the friction ring to a single friction ring half has the advantage that the cooling of the individual cooling channels can be configured more uniformly, since the cooling channels, which are affected by the placement of the connecting means, are not ventilated exclusively by way of their hollow center, but rather a part of the cooling channel cross section can be additionally kept free for air to flow through. The connecting means can be placed laterally during such fastening such that at least half of the cooling channel cross section can remain open for the throughflow and thus the cooling channel is supplied with cooling air, from the internal diameter of the friction ring, both through the respective connecting means and via the cooling channel inlet. To this end, the friction ring half which forms the single fit to the brake disk nave advantageously has material convexities, which point inward toward the cooling channels or the ribs, at the points at which the second bores are introduced for the connecting means. A configuration of the material convexities such that they have in their cross section constant wall thicknesses which transition into one another by means of radii has the advantageous effect of favorable distribution of stress when there is heating as a result of the braking operation, and when there is subsequent cooling, by virtue of the constant cross section of the wall of the friction disk and brake disk nave in the region of the material convexities for placing the connecting means.

To this end, it is also advantageous that the second bores for the connecting means have at their radially outer end an outlet channel for ventilation into a cooling channel. The internal diameter of the outlet channel should then preferably have at least the internal diameter of a mounted connecting means. This outlet channel may have a bore made in it during production in the same work step with the first and the second bore, for example by means of a step drill. As an alternative to this, it is also possible to use a progressive tool to produce the first and the second bore and the outlet channel. In the two production methods, the friction ring and brake disk nave are centered in relation to one another only once and then advantageously all bores for the connecting means, that is to say the first and the second bore and that of the outlet channel, are introduced, in particular per connecting means in one work step or by means of a progressive tool.

Clamping sleeves or blind rivets or locating pins with an axially directed passage bore are preferably provided as hollow connecting means between the brake disk nave and friction ring, more precisely the individual friction ring half.

Preferred embodiments of the invention are characterized in that the single friction ring half forming the fit to the brake disk nave, as seen in the axial direction of the brake disk, is that one which lies in the direction of a nave base of the brake disk nave. If the fit between the brake disk nave and friction ring half is then an oversize fit or a transition fit (in accordance with ISO 286) and the internal diameter of the friction ring half provided therewith is smaller than the internal diameter of the friction ring half which does not have a fit, corresponding fitting surfaces can be easily produced on the collar of the brake disk nave and on the friction ring half with the smallest internal diameter, which, as seen in the axial direction of the brake disk, lies in the direction of the nave base of the brake disk nave, and similarly the brake disk nave can be pressed into the friction ring, in the event of use of an interference fit, in order to mount the fitting seat, in the axial direction of the brake disk with the nave base in front from the side of the friction ring with the friction ring half which does not have a fit, on account of its larger internal diameter. It is particularly simple for the pressing of the brake disk nave into the friction ring to be ended when shape parity is reached between the friction ring and the brake disk nave on the inner side of the friction ring half which has a fit, as seen in the axial direction of the brake disk.

Further advantageous embodiments of the invention are characterized in that the brake disk nave consists of steel or of a non-metal material or preferably of light metal. In the case of the latter material, the result is a particularly great weight saving paired with inexpensive production methods by deep drawing or flow pressing or bending or casting. In the case of the brake disk nave, in conjunction with the materials claimed for it and with the structure of the brake disk, it is precisely these production methods that ensure that even when the brake disk is heated up to a great extent as a result of frictional heat during the braking operation, despite the resulting material volume expansion with different coefficients of thermal expansion of the brake disk nave and the friction ring, the fitting connection thereof remains and predominantly the elasticity of the brake disk nave compensates the radial expansion. Therefore, advantageously no relative movement in the region of the connecting means takes place, this preventing abrasive wear from arising on it and on the internal circumference of the first and the second bore.

In terms of vibrations, it is additionally also favorable if the number of connecting means and therefore of the material convexities over the circumference of the brake disk corresponds to a prime number or an even number.

A particularly preferred method for producing a brake disk is characterized by the following method steps:
  producing corresponding fitting surfaces on the external diameter of the collar of the brake disk nave and on the internal diameter of the friction ring half which, as seen in the axial direction of the brake disk, is located closer to the nave base of the brake disk nave;
  pressing the brake disk nave into the friction ring half in the axial direction of the brake disk, in particular with the nave base in front, from the side of the friction ring with the friction ring half which does not have a fit;
  ending the pressing of the brake disk nave into the friction ring half when shape parity is reached between the inner side of the friction ring half which has a fit and the brake disk nave collar, as seen in the axial direction of the brake disk, on the inner side of the friction ring half which has a fit;
  boring the first and second bores, at least in a respective work step per bore pair composed of a first and a second bore, and boring the outlet channel;
  introducing a respective connecting means into each bore pair composed of a first and a second bore.

Advantageously, when the brake disk nave is shaped with subsequent connection to the friction ring, the lubricant, remaining on the surface of the brake disk nave, from the shaping, for example the deep-drawing oil, is also used subsequently as lubricant for the joining of the transition or oversize fit.

In the case of the connecting means, in particular when clamping sleeves are being used, a very advantageous effect against the displacement thereof is brought about when they are fixed in place in each bore pair after being introduced into the latter. However, introducing a respective snap ring or spring ring on the radially inner end into the first bores may also serve to fix the position of the connecting means. As an alternative to this, it is also possible to fix all connecting means in their position by means of a single clamping ring, placed in the inner circumference of the casing of the brake disk nave, at the level of the bore circle of the first bores.

The connecting means may have in the circumferential direction a structure for improved force transfer, for example a corrugation or a grooved profile, this in that case creating a form fit between the friction ring and the brake disk nave in the axial direction of the connecting means, in addition to the form fit in the circumferential direction of the brake disk by way of the connecting means and to the frictional engagement in the circumferential direction of the brake disk by way of the transition or oversize fit.

A preferred exemplary embodiment of the present disclosure of a brake disk and of the method for producing it is illustrated schematically in the appended drawings, in which:

BRIEF DESCRIPTION OF THE DRAWINGS

FIG. 1 shows a brake disk in a radially directed partial cross section, having a clamping sleeve as connecting means; and FIG. 2 shows a detail from the brake disk according to FIG. 1 in the form of an enlarged partial section of the fitting surface of the friction ring in the radial direction, on a region of two radially directed second bores, lying next to one another, for two clamping sleeves (which are not depicted) at the parting surface between the friction ring and the brake disk nave.

DETAILED DESCRIPTION OF THE DRAWINGS

The brake disk 1, illustrated in part in the figures, of a disk brake for a motor vehicle consists of a brake disk nave 3 and a friction ring 2, and is provided for mounting on a wheel hub (which is not depicted), for rotation therewith. The one-piece, internally cooled or ventilated friction ring 2, manufactured in gray cast iron, consists of two friction ring halves 2', 2", each having an external friction surface 4', 4"

and ribs 5, which lie between the friction ring halves 2', 2", connect the latter to one another on their inner side, and form cooling channels 6 of a cooling-air guide through the friction ring 2. The annular friction ring half 2' which is closer to the brake disk nave 3 as viewed in the axial direction, i.e. in the direction of an axis of rotation D of the brake disk 1, extends as seen in the radial direction R (with respect to the axis of rotation D) by way of what is known as a fastening projection 7 by a certain amount further toward the axis of rotation D than the other friction ring half 2", which is more remote from the brake disk nave 3 in the axial direction.

An inner circumferential surface 7' of the fastening projection 7 of the friction ring half 2' forms a fit with an outer circumferential surface 9' of the brake disk nave 3 and both the friction ring half 2' and the brake disk nave 3 are additionally connected to one another via radially directed, slitted clamping sleeves 8, which are introduced in a collar 9 on the casing 10 in radially directed first bores 16, and from there extend further in likewise radially directed, coaxial second bores 17 in the friction ring half 2' into the friction ring half. In this respect, the friction ring half 2' which forms the fit to the brake disk nave 3 is closer, as seen in the axial direction of the brake disk, in the direction of a nave base 11 of the brake disk nave 3 and the number of the clamping sleeves 8, used to connect the friction disk 2' and the brake disk nave 3, over the brake disk circumference corresponds to a prime number or an even number.

On its cooling channel side, the friction ring half 2' is thickened for the purpose of placing the clamping sleeves 8 in that it has material convexities 18, which point inward, depending on the position of the clamping sleeves 8, toward the cooling channels 6 or toward the ribs 5, at the points at which the second bores 17 for the clamping sleeves 8 are introduced. Here, the material convexities 18 are configured such that they have in their cross section constant wall thicknesses (FIG. 2, arrows 12) which transition into one another via radii 13, 14. This keeps the cross section, weakened by the first and second bores 16, 17, of the brake disk nave 3 and the friction disk half 2' constant by means of wall depressions 21 for the better distribution of stress. The wall cross section 12 of the friction ring half 2' between its friction surface 4' and the bore walls 17' of the bores 17 for the clamping sleeves 8 is also the same as the wall cross section of the friction ring half 2' between its friction surface 4' and the wall depression 21 of the material convexity 18 for placing the clamping sleeves 8.

At their radially outer end, the second bores 17 for the clamping sleeves 8 have a cooling-air outlet channel 15, which opens out into a cooling channel 6. As a result, air flows through the clamping sleeves 8. This is particularly advantageous for cooling when the internal diameter of the cooling-air outlet channel 15 corresponds at least to the internal diameter of a mounted clamping sleeve 8, with the result that between the two friction ring halves 2', 2" there is an unthrottled guidance of air flow in the region of the clamping sleeves 8 both through them and parallel thereto via a still-open region 6' of the cooling channel 6 between the ribs 5, from the interior of the brake disk 1 through the cooling channels 6 to the outside.

The brake disk nave 3 consists of light metal or of steel or of a non-metal material, that is to say materials considered for the brake disk nave 3 are preferably higher-strength high-strength light metals (magnesium, among other things) or a high-strength, thin-walled steel sheet or aluminum and other non-iron or non-metal materials. The brake disk nave can therefore be produced for example by a casting method or a forging method or by flow pressing or in particular by deep drawing. When use is made of a brake disk nave 3 according to the invention that is made from a lightweight material, the use of steel wheels is possible in addition to aluminum wheels.

The brake disk is produced in method steps which follow one another by producing corresponding fitting surfaces of an oversize fit or a transition fit on an outer circumferential surface 9' of the collar 9 of the brake disk nave 3 and on an inner circumferential surface 7' of the fastening projection 7 of the friction ring half 2' which, as seen in the axial direction of the brake disk 1, is located closer to the nave base 11 of the brake disk nave 3;

pressing or sliding, depending on the fit selected, the brake disk nave 3 into the friction ring half 2' in the axial direction of the brake disk 1, with the nave base 11 in front, from the side of the friction ring 2 with the friction ring half 2" which does not have a fit and the internal diameter of which is larger than that of the friction ring half 2' with the fit to the brake disk nave 3 on the fastening projection 7;

ending the pressing of the brake disk nave 3 into the friction ring half 2' when shape parity is reached between the inner side of the friction ring half 2' which has a fit and the brake disk nave collar 9, as seen in the axial direction of the brake disk 1 in the pressing-in direction of the brake disk nave 3;

boring the first and second bores 16, 17, at least in a respective work step per bore pair composed of a first and a second bore 16, 17, and the outlet channel 15;

introducing and fixing in place the clamping sleeves 8 in the form of connecting means into the bore pairs composed of a first and a second bore 16, 17.

In this way, the in particular deep drawn brake disk nave 3 of light metal is pressed into the friction ring half 2' advantageously in a slightly pretensioned manner. Then, bores are jointly made in the brake disk nave 3 and the friction ring half 2' and the brake disk nave and friction ring half are connected to the connecting means, preferably clamping sleeves 8, and thereupon secured against falling out by means of being fixed in place. If blind rivets are used as connecting means instead of the clamping sleeves 8, the method step of fixing in place is omitted.

What is claimed is:

1. A disk brake for a motor vehicle, comprising:
   an internally ventilated brake disk having a friction ring with an external friction surface on each one of two friction ring halves connected by ribs which are located therebetween, the ribs forming cooling channels between the friction ring halves;
   a brake disk nave, which is connected to the friction ring via radially directed connecting means and has on its casing a collar, which extends in the radial direction and forms a fit to an external diameter of the friction ring by way of an outer circumferential surface and to an internal diameter of the friction ring by way of an inner circumferential surface; and
   radially directed first bores, in which the connecting means are introduced such that they extend further into radially directed second bores in the friction ring, wherein
   the brake disk nave forms the fit with a single friction ring half and this fit has material convexities, which point inward toward the cooling channels or the ribs, at the points at which the second bores are introduced for the connecting means.

2. The disk brake according to claim 1, wherein the single friction ring half forming the fit to the brake disk nave, as seen in the axial direction of the brake disk one of the two friction ring halves which lies closer to a nave base of the brake disk nave.

3. The disk brake according to claim 2, wherein the connecting means between the brake disk nave and the friction ring half are locating pins, which have a central passage bore in their axial direction.

4. The disk brake according to claim 3, wherein the connecting means have in the circumferential direction a surface structure configured to improve force transfer, in particular a corrugation or a grooved profile.

5. The disk brake according to claim 4, wherein the fit between the brake disk nave and the friction ring half is a transition fit.

6. The disk brake according to claim 5, wherein the brake disk nave consists of light metal or of steel or of a non-metal material.

7. The disk brake according to claim 6, wherein the material convexities are configured such that they have in their cross section constant wall thicknesses which transition into one another by means of radii forming edge fillets.

8. The disk brake according to claim 7, wherein the second bores for the connecting means have at their radially outer end a cooling-air outlet channel into a cooling channel.

9. The disk brake according to claim 8, wherein the internal diameter of the cooling-air outlet channel corresponds at least to a free internal diameter of one connecting means of the connecting means.

10. The disk brake according to claim 9, wherein the internal diameter of the friction ring half which has the fit to the brake disk nave is smaller than the internal diameter of the friction ring half which does not have the fit to the brake disk nave.

11. The disk brake according to claim 10, wherein the number of the connecting means over the brake disk circumference corresponds to a prime number or an even number.

12. The disk brake according to claim 4, wherein the fit between the brake disk nave and the friction ring half is an oversize fit.

13. The disk brake according to claim 2, wherein the connecting means between the brake disk nave and the friction ring half are blind rivets.

14. The disk brake according to claim 2, wherein the connecting means between the brake disk nave and the friction ring half are clamping sleeves.

15. A method for producing a brake disk comprising:
producing corresponding fitting surfaces on the external diameter of a collar of a brake disk nave and on an internal diameter of a friction ring half which, as seen in the axial direction of a brake disk, is located closer to a nave base of the brake disk nave;
pressing the brake disk nave into the friction ring half in the axial direction of the brake disk, with the nave base in front, from the side of the friction ring with the friction ring half which does not have a fit;
ending the pressing of the brake disk nave into the friction ring half when shape parity is reached between the inner side of the friction ring half which has the fit to the brake disc nave, and the brake disk nave collar, as seen in the axial direction of the brake disk, on the inner side of the friction ring half, which has the fit to the brake disc nave;
boring first and second bores, at least in a respective work step, per bore pair composed of one first and one second bore, and boring the cooling-air outlet channel; and
introducing a respective connecting means into each bore pair.

16. The method according to claim 15, wherein the connecting means are clamping sleeves, which are fixed in place in each bore pair after being introduced therein.

* * * * *